US006293602B1

United States Patent
Presley

(10) Patent No.: US 6,293,602 B1
(45) Date of Patent: Sep. 25, 2001

(54) SLIDING TAILGATE PANEL

(75) Inventor: William T. Presley, Macomb Township, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/612,666

(22) Filed: Jul. 10, 2000

Related U.S. Application Data

(60) Provisional application No. 60/174,248, filed on Jan. 3, 2000.

(51) Int. Cl.[7] .............................. B62C 1/06; B62D 25/00
(52) U.S. Cl. .................... 296/26.11; 296/57.1; 296/146.8
(58) Field of Search ................................. 296/57.1, 39.1, 296/106, 146.8, 26.11

(56) References Cited

U.S. PATENT DOCUMENTS

| Re. 36,267 | 8/1999 | Moore et al. . | |
|---|---|---|---|
| D. 420,317 | 2/2000 | Ney . | |
| 1,895,325 | * 1/1933 | Herbert | 296/57.1 |
| 3,010,760 | * 11/1961 | Trautmann | 296/57.1 |
| 4,040,654 | * 8/1977 | Hill et al. | 296/57.1 |
| 4,079,988 | * 3/1978 | Randall | 296/57.1 |
| 4,114,944 | * 9/1978 | Joynt et al. | 296/50 |
| 4,171,844 | * 10/1979 | Landaal et al. | 296/57.1 |
| 4,763,945 | * 8/1988 | Murray | 296/57.1 |
| 5,110,172 | 5/1992 | Ney et al. . | |
| 5,188,415 | * 2/1993 | Wagner | 296/57.1 |
| 5,448,856 | 9/1995 | Moore et al. . | |
| 5,518,286 | * 5/1996 | McCormack | 296/57.1 |
| 5,531,498 | 7/1996 | Kowall . | |
| 5,664,822 | * 9/1997 | Rosenfield | 296/39.2 |
| 5,868,449 | * 2/1999 | Hitchcock | 296/57.1 |
| 5,904,391 | * 5/1999 | Liljenquest et al. | 296/57.1 |
| 5,918,925 | 7/1999 | Perrin . | |
| 6,068,321 | 5/2000 | Ooms . | |

* cited by examiner

Primary Examiner—D. Glenn Dayoan
Assistant Examiner—Hilary Gutman
(74) Attorney, Agent, or Firm—Mark P. Calcaterra

(57) ABSTRACT

A tailgate assembly for a vehicle having a tailgate structure, a hinge structure, a guide track and a panel structure. The hinge structure couples the tailgate structure to the vehicle body and is operable for rotating the tailgate structure between a generally vertical raised position and a generally horizontal lowered position. The guide track is coupled to at least one of the hinge structure and the tailgate structure. The panel structure is in sliding engagement with the guide track such that the panel structure is movable along the guide track between a retracted position wherein the panel structure is at least partially disposed between the inner member and the outer member and an extended position adapted to substantially close a horizontal gap between the tailgate structure and the body of the vehicle. Placement of the tailgate structure in the raised position causes the panel structure to move along the guide track to the retracted position. Placement of the tailgate structure in the lowered position causes the panel structure to move along the guide track to the extended position.

11 Claims, 5 Drawing Sheets

SLIDING TAILGATE PANEL

This application claims the benefit of U.S. Provisional Application No. 60/174,248, filed Jan. 3, 2000.

BACKGROUND OF THE INVENTION

1. Technical Field

The present invention relates generally to motor vehicles. More particularly, the present invention pertains to hinged closure panels for motor vehicles. More specifically, but without restriction to the particular embodiment and/or use which is shown and described for purposes of illustration, the present invention relates to a pick-up truck having a tailgate attached to the body for rotation about a horizontal pivot axis about a lower edge of the tailgate and a concealed panel structure which substantially closes a gap between the tailgate and a bed of the pick-up truck when the tailgate is placed in a lowered position.

2. Discussion

It is well known in the art to provide a vehicle, such as a pick-up truck, with a tailgate which is attached to the body of the vehicle for rotation about a horizontal pivot axis about a lower edge of the tailgate. Typically, such vehicles are designed in a manner wherein a relatively small gap between the tailgate and the bed or floor of the vehicle exists when the tailgate is placed in the lowered position. Accordingly, vehicle designers must consider both the configuration of the tailgate and the vehicle bumper so as to avoid interferences between the two that would inhibit the lowering of the tailgate into a lowered, horizontal position.

Construction of the vehicle in this manner significantly limits the ability of the vehicle designer to configure the tailgate and the bumper in an aesthetically pleasing manner. For example, if a relatively large (i.e., deep) bumper was desired, the bumper would typically be positioned below the location of the lowered tailgate so as to avoid the possibility of interference between the tailgate and the bumper. Designs of this type, however, permit the hinge line of the tailgate to be viewed and do not provide flexibility in the vertical positioning of the bumper.

Gooseneck hinges may be employed to couple the tailgate to the vehicle body where the bumper is configured or positioned in a manner which interferes with the tailgate. This approach, however, swings the tailgate away from the bed or floor of the vehicle as the tailgate is lowered and causes the creation of a large gap between the tailgate and the bed or floor of the vehicle. Large gaps between the tailgate and the bed or floor of the vehicle are not desirable for a number of reasons, the primarily one being the negative impact on the appearance of the vehicle when the tailgate is lowered.

SUMMARY OF THE INVENTION

It is one object of the present invention to provide a tailgate assembly having a construction which permits a vehicle designer to configure the tailgate and the bumper in an aesthetically pleasing manner.

It is another object of the present invention to provide a tailgate assembly which employs a sliding panel to substantially eliminate a gap between a tailgate and a vehicle end surface.

In one form, the present invention provides a tailgate assembly for a vehicle having a tailgate structure, a hinge structure, a guide track and a panel structure. The hinge structure couples the tailgate structure to the vehicle body and is operable for rotating the tailgate structure between a generally vertical raised position and a generally horizontal lowered position. The guide track is coupled to at least one of the hinge structure and the tailgate structure. The panel structure is in sliding engagement with the guide track such that the panel structure is movable along the guide track between a retracted position wherein the panel structure is at least partially disposed between the inner member and the outer member and an extended position adapted to substantially close a horizontal gap between the tailgate structure and the body of the vehicle. Placement of the tailgate structure in the raised position causes the panel structure to move along the guide track to the retracted position. Placement of the tailgate structure in the lowered position causes the panel structure to move along the guide track to the extended position.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
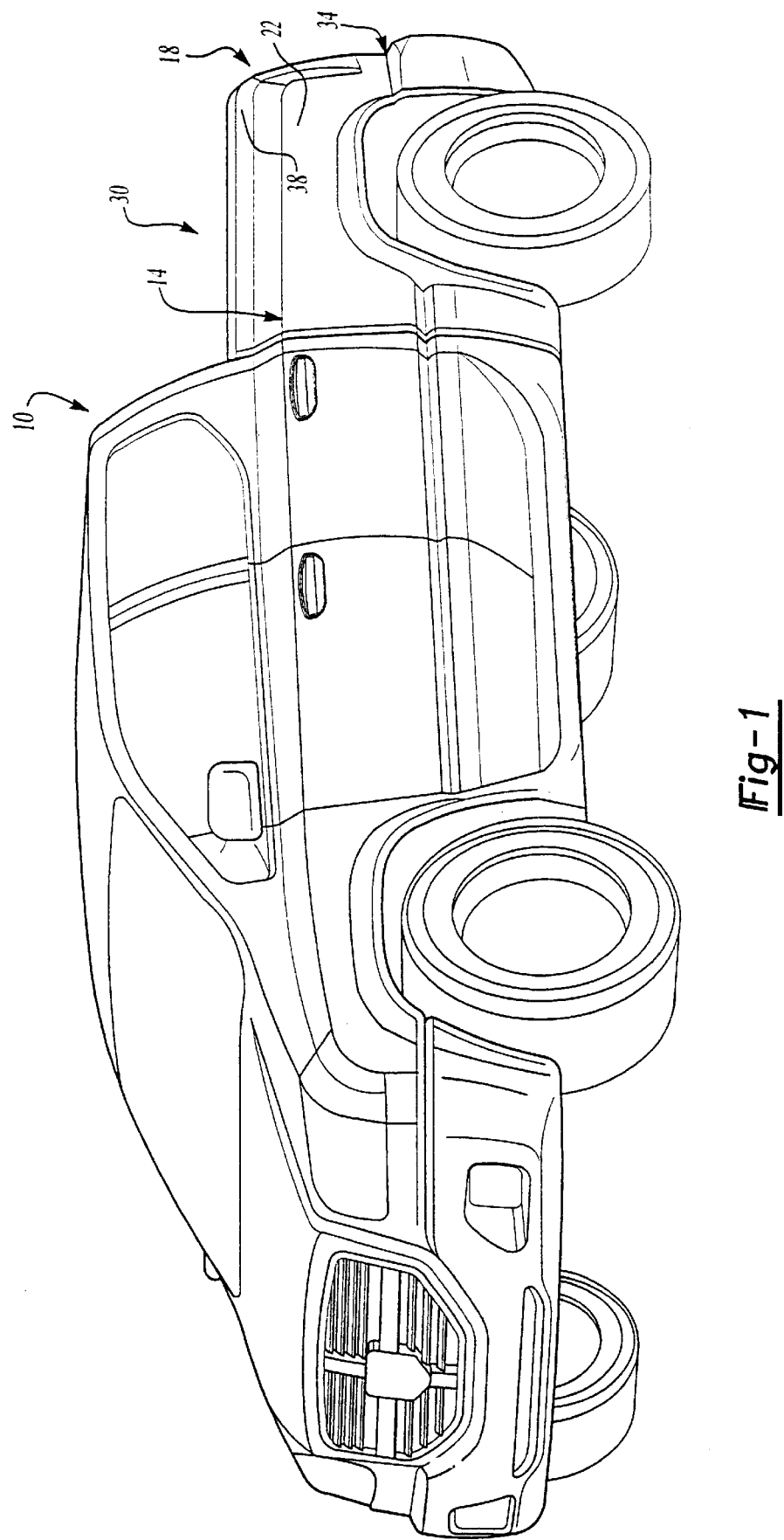
FIG. 1 is a perspective view of a vehicle constructed in accordance with the teachings of the present invention.
Figure 2:
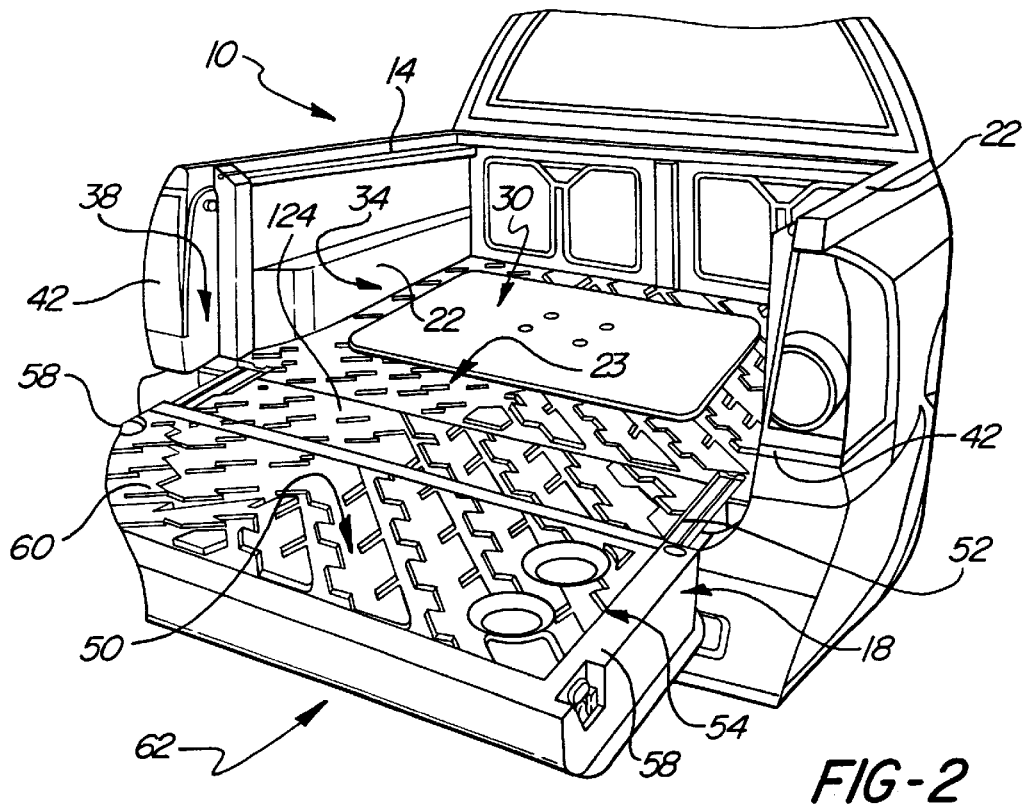
FIG. 2 is a perspective view of the vehicle of FIG. 1 illustrating the tailgate in a lowered position.

With reference to FIGS. 1 and 2 of the drawings, a vehicle constructed in accordance with the teachings of the present invention is generally indicated by reference numeral 10. As will be discussed in greater detail below, vehicle 10 includes a vehicle body 14 and a closure member, such as a tailgate assembly 18, which may be articulated between a raised position as illustrated in FIG. 1 and a lowered position as illustrated in FIG. 2. Although the particular vehicle illustrated is a pick-up truck, it will be understood that the teachings of the present invention have applicability to other types of vehicles, including but not limited to sport utility vehicles, minivans, station wagons and other vehicles having a tailgate which pivots about a lower horizontal axis.

Vehicle body 14 includes a pair of laterally spaced apart side walls 22 and a generally horizontal floor 23 which conventionally form a bed 30 with a bed aperture 34 formed at its rearward end 38. The rearward edges 42 of laterally spaced apart side walls 22 may be formed in a generally vertical manner or may be contoured to a desired shape as illustrated.

In FIGS. 3 through 6, tailgate assembly 18 is shown to include a tailgate structure 50, a hinge mechanism 52, a guide track 54 and a panel structure 56. Tailgate structure 50 includes a pair of lateral members 58, an inner panel member 60 and an outer panel member 62. Lateral members 58, inner panel member 60 and outer panel member 62 are coupled to one another to form a container-like fabrication having a cavity 64 and an opening 66 along its bottom edge.

Figure 6:
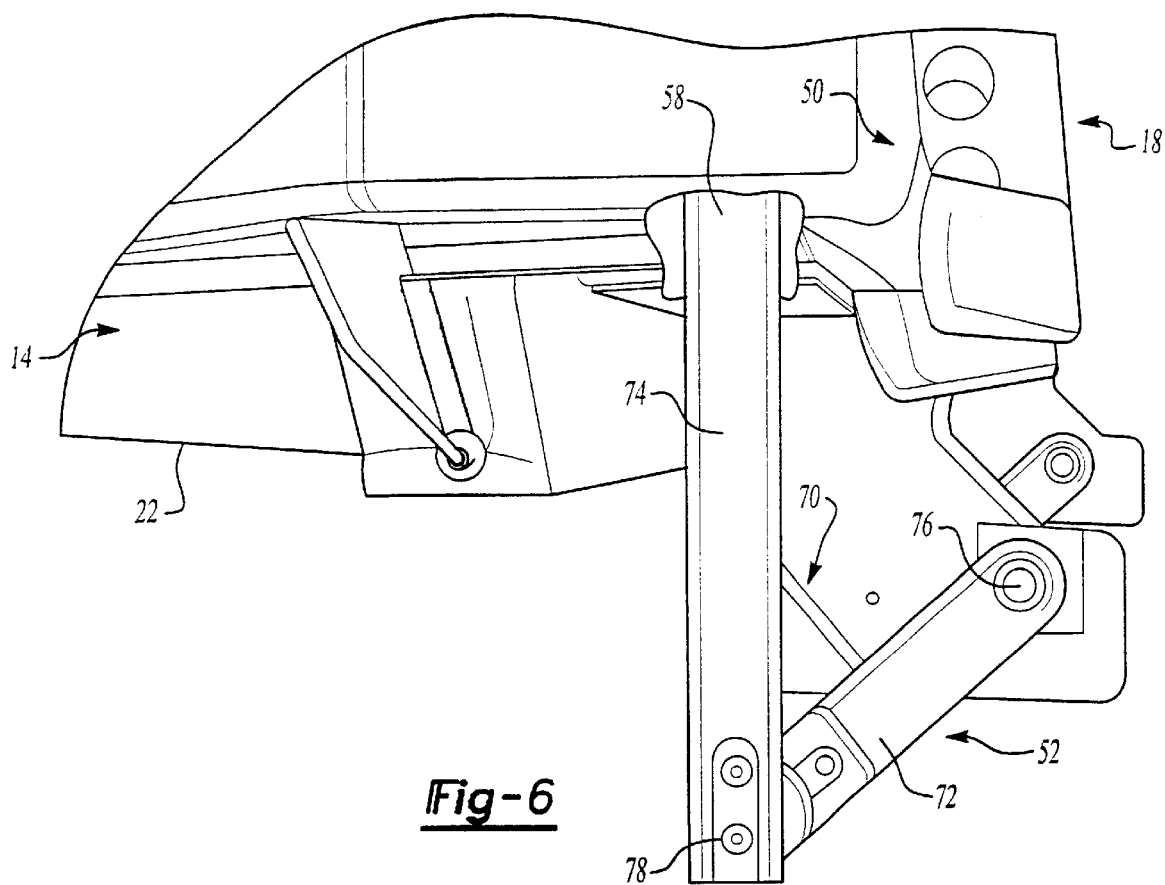
FIG. 6 is a view of a portion of the vehicle of FIG. 1 illustrating the hinge mechanism in greater detail.

As best shown in FIG. 6, hinge mechanism 52 includes a pair of hinge assemblies 70 each having a first hinge member 72, a second hinge member 74 and first and second pivot pins 76 and 78, respectively. First pivot pin 76 pivotably couples a first end of first hinge member 72 to one of the laterally spaced apart side walls 22 of vehicle body 14. Second pivot pin 78 pivotably couples a second end of first hinge member 72 to a first end of second hinge member 74. The second end of second hinge member 74 is coupled to one of the lateral members 58 of tailgate structure 50. Hinge mechanism 52 permits tailgate structure 50 to be pivoted to a generally vertical raised position wherein inner panel member 60 is perpendicular to and abuts the horizontal floor of bed 30. Hinge mechanism 52 also permits tailgate structure 50 to be pivoted to a generally horizontal lowered position wherein inner panel member 60 is generally parallel to and axially spaced from the horizontal floor of bed 30. When the tailgate structure 50 is placed in a lowered position, the first and second hinge members 72 and 74 are arranged in a generally V-shape.

Figure 3:
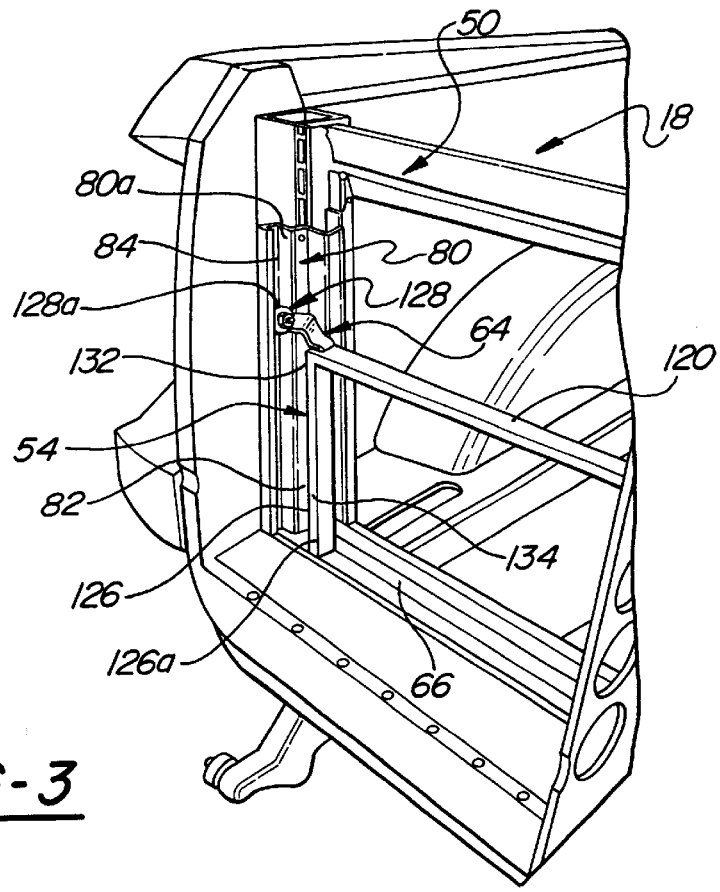
FIG. 3 is a fragmentary view of the tailgate assembly of the vehicle of FIG. 1 showing the panel structure in a retracted position.
Figure 4:
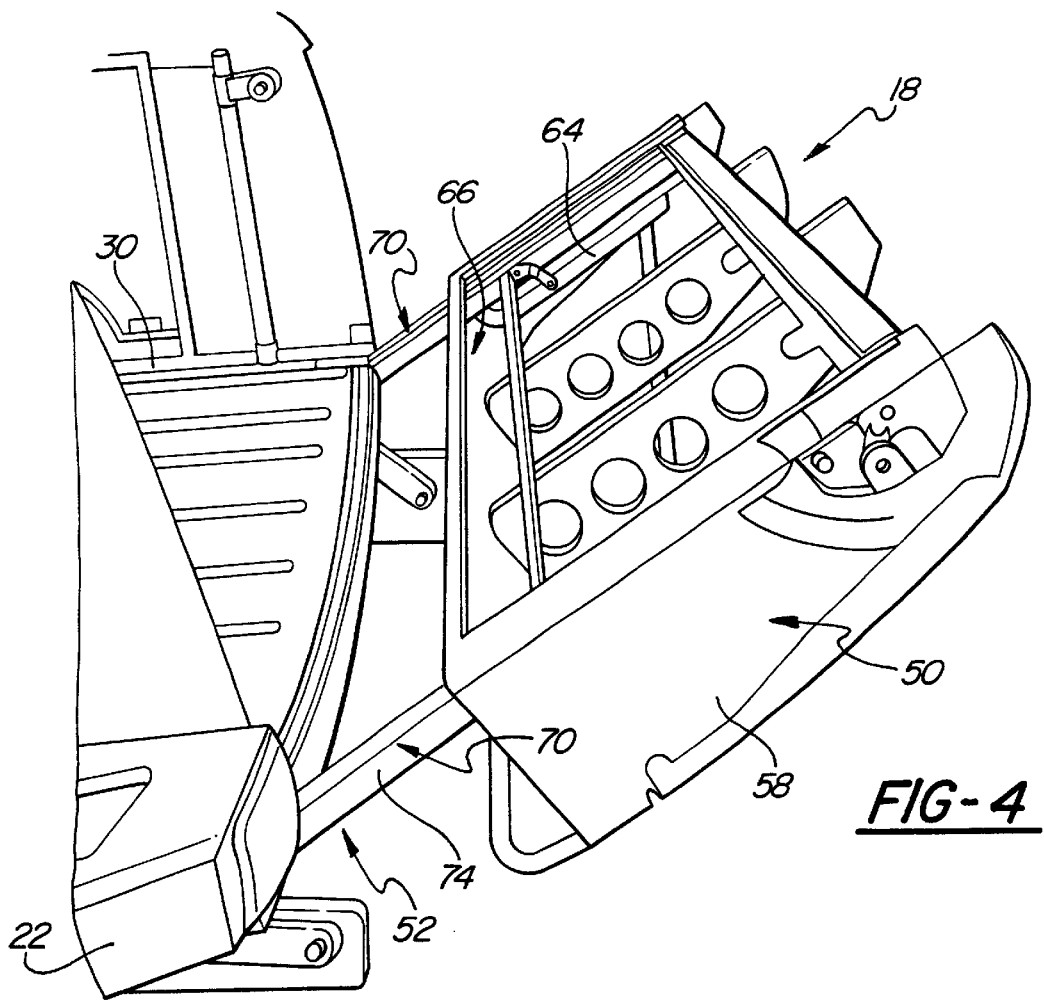
FIG. 4 is a fragmentary view of the tailgate assembly of the vehicle of FIG. 1 showing the panel structure in an intermediate position.
Figure 5:
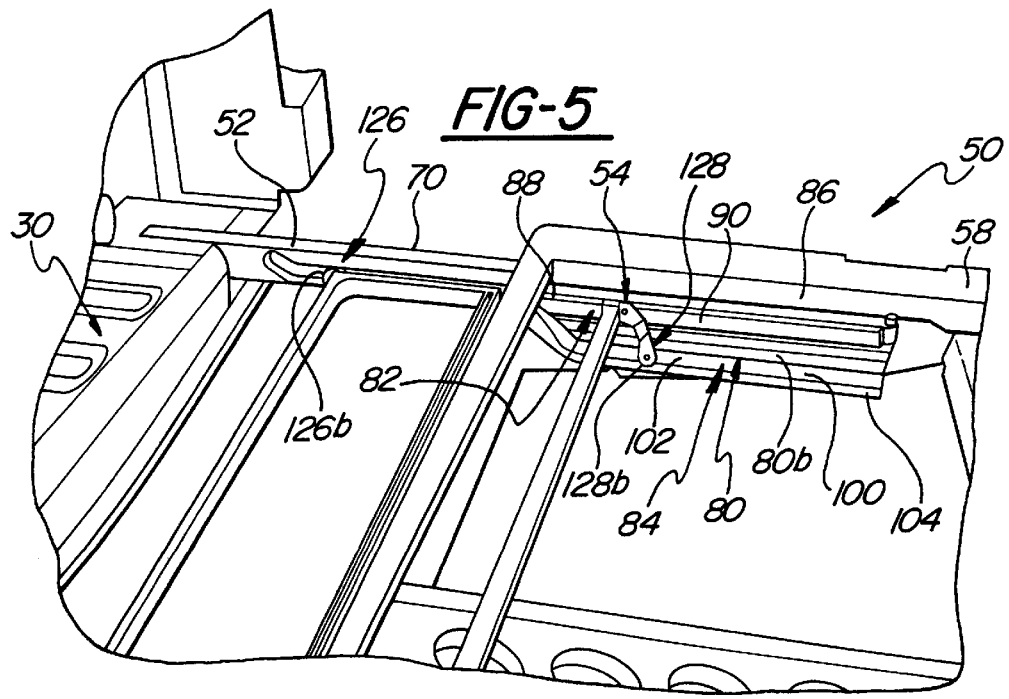
FIG. 5 is a view similar to that of FIG. 4 showing the panel structure in the extended position.
Figure 7:
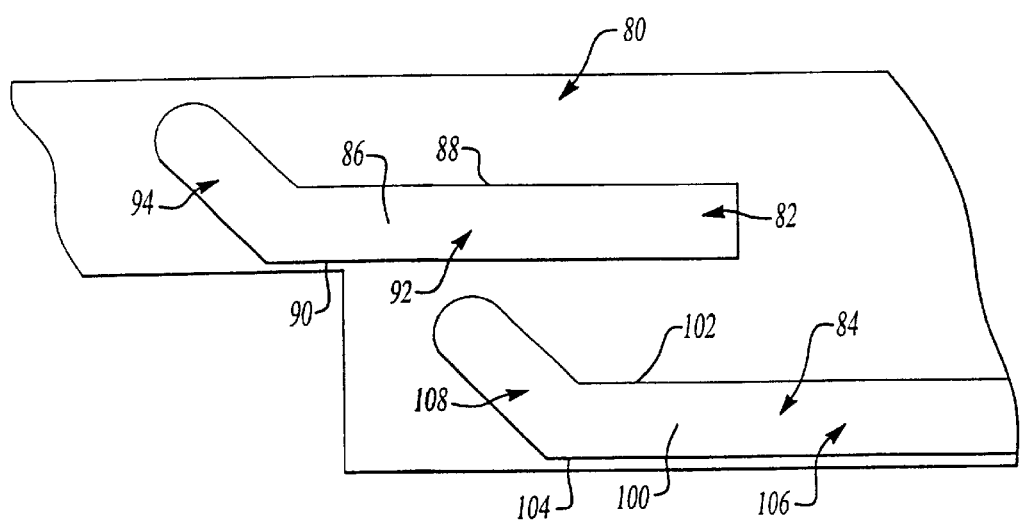
FIG. 7 is a side elevational view of the guide track of the tailgate assembly.

With reference to FIGS. 3, 5 and 7, guide track 54 includes a pair of guide members 80 (referred to individually as guide members 80a and 80b) in the particular embodiment illustrated. Each guide member 80 is coupled to one of the hinge assemblies 70 and an associated lateral member 58. Each guide member 80 includes a first guide portion 82 and a second guide portion 84. First guide portion 82 is generally C-shaped in construction having an outer wall 86, an upper wall 88 and a lower wall 90. First guide portion 82 includes a generally straight channel portion 92 and a dog-leg portion 94. Channel portion 92 extends along the inboard surface of lateral member 58, through opening 66 and along the inboard surface of an associated second hinge member 74. Dog-leg portion 94 is coupled to the forward end of channel portion 92 and is skewed in a direction that is upward from inner panel member 60 and toward bed 30 when tailgate structure 50 is placed in the lowered position.

Second guide portion 84 is also generally C-shaped in construction having an outer wall 100, an upper wall 102 and a lower wall 104. Second guide portion 84 includes a generally straight channel portion 106 and a dog-leg portion 108. When tailgate structure 50 is placed in the lowered position, channel portion 106 and dog-leg portion 108 are spaced vertically below and axially back from dog-leg portion 94.

With reference to FIGS. 1, 3 and 5, panel structure 56 includes a frame member 120, an outer member (not specifically shown), an inner member 124, a pair of first rollers 126 (referred to individually as rollers 126a and 126b) and a pair of second rollers 128 (referred to individually as rollers 128a and 128b). Frame member 120 is a generally rectangular construction whose length and width are configured to approximately match the length and width of the gap between bed 30 and tailgate structure 50 when tailgate structure 50 is placed in the lowered position. Each of the first rollers 126 is coupled to a forward edge 132 of the panel structure 56 and each of the second rollers 128 is coupled to a rearward edge 134 of the panel structure 56.

With additional reference to FIG. 7, each first roller 126 is placed in the first guide portion 82 of the guide member 80 and each second roller 128 is placed in the second guide portion 84 of the guide member 80. Panel structure 56 is therefore permitted to roll freely on guide track 54 between a retracted position (FIG. 3) wherein panel structure 56 is at least partially housed within cavity 64 between inner and outer panel members 60 and 62, and an extended position (FIG. 2) wherein each of the rollers is located in a dog-leg portion of a corresponding guide portion. Placement of panel structure 56 in the extended position positions frame member 120 between bed 30 and tailgate structure 50 such that inner member 124 is parallel to, and preferably coplanar with, inner panel member 60 and the floor of bed 30.

Figure 8:
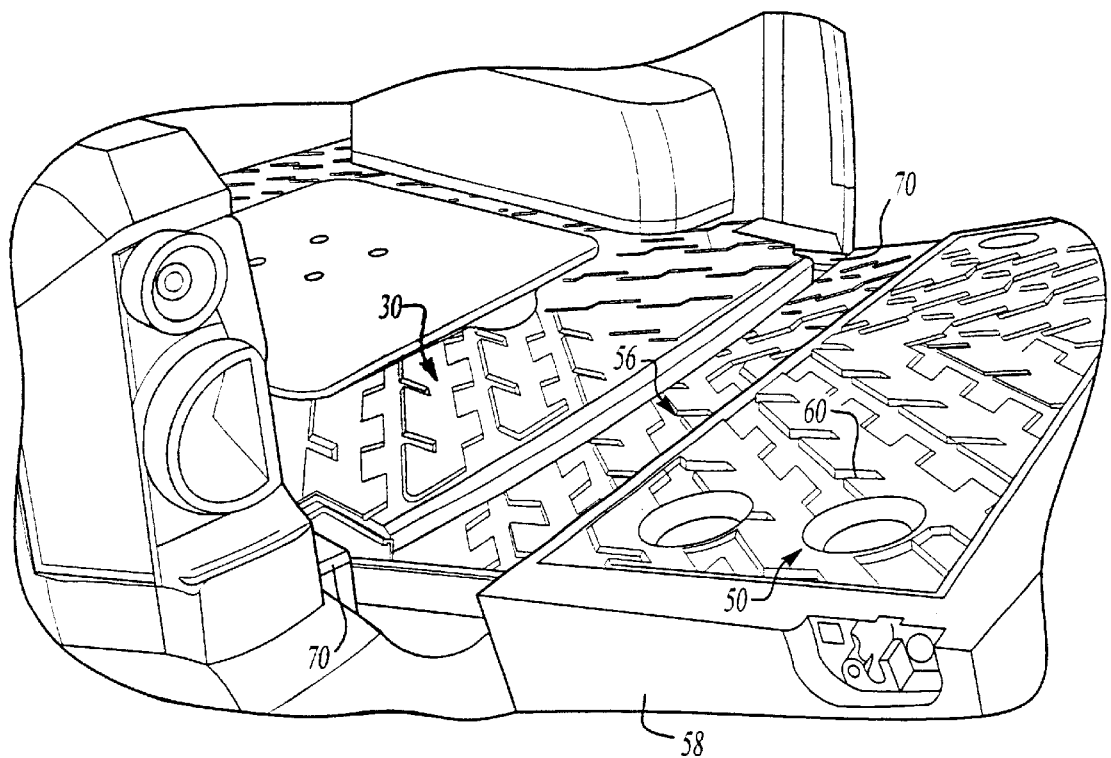
FIG. 8 is a perspective view of the vehicle of FIG. 1 showing the panel structure in an intermediate position.

When tailgate structure 50 is placed in the raised position (FIG. 3), panel structure 56 contacts the floor of bed 30, causing panel structure 56 to remain in cavity 64 between inner and outer panel members 60 and 62. As tailgate structure 50 is lowered (FIGS. 4, 5 and 8), panel structure 56 is permitted to slide along guide track 54 into the gap that forms between tailgate structure 50 and bed 30. When tailgate structure 50 is placed into the lowered position (FIG. 2), the rollers of panel structure 56 are permitted to enter the dog-leg portions of their associated guide portions, causing panel structure 56 to move both rearwardly toward bed 30 and upwardly so that inner member 124 is in a plane parallel to and preferably coplanar with the floor of bed 30 and inner panel member 60. Similarly, moving tailgate structure 50 out of the lowered position causes the rollers of panel structure 56 to roll out of the dog-leg portions and into the channel portions of their associated guide portions so that the panel structure 56 is moved between the inner and outer panel members 60 and 62 and into cavity 64.

Figure 9:
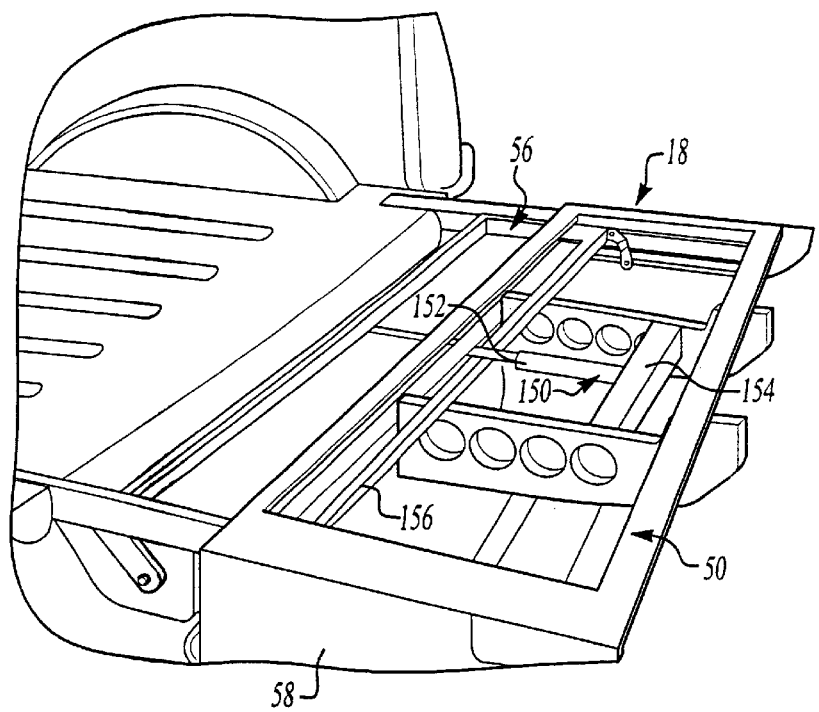
FIG. 9 is a fragmentary view of a tailgate assembly constructed in accordance with an alternate embodiment of the present invention illustrating the use of an assist mechanism.

While guide track 54 and panel structure 56 may be configured in a manner wherein gravity alone causes panel structure 56 to traverse from the retracted position to the extended position, it is presently preferred that an assist mechanism 150, as shown in FIG. 9, be coupled to panel structure 56 to provide a force thereto which drives panel structure 56 upward so that its rollers roll into the dog-leg portions of their associated guide portions. The particular type of assist mechanism 150 shown is a gas strut 152 which is coupled at a first end to a structural member 154 of tailgate structure 50 and at a second end to the rear edge 156 of panel structure 56. Gas strut 152 is operable for applying a light force to panel structure 56 just before panel structure 56 reaches the extended position. Configuration in this manner minimizes the force exerted by the assist mechanism 150, improving the durability of tailgate assembly 18 as well as minimizing the force required to raise the tailgate from the lowered position to the raised position.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A tailgate assembly for a vehicle having a vehicle body, the tailgate assembly comprising:

a tailgate structure having a plurality of frame members, an inner member coupled to a first side of the frame members and a outer member coupled to a second side of the frame member, the frame members, inner member and outer member cooperating to define a panel cavity, the tailgate structure adapted to be pivotably coupled to the vehicle body and positionable between a generally vertical raised position and a generally horizontal lowered position; and a panel structure slidably disposed within the panel cavity and movable between a retracted position wherein the panel structure is at least partially disposed between the inner member and the outer member and an extended position adapted to substantially close a horizontal gap between the tailgate structure and the vehicle body;

wherein placement of the tailgate structure in the raised position causes the panel structure to move into the panel cavity to the retracted position and placement of the tailgate structure in the lowered position causes the panel structure to move out of the panel cavity into the extended position.

2. The tailgate assembly of claim 1, wherein the panel structure includes a plurality of rollers which engage a guide track that is coupled to at least one of the hinge structure and the tailgate structure, the guide track guiding the pluraltiy of rollers when the panel structure is moved between the retracted and extended positions.

3. The tailgate assembly of claim 2, wherein the guide track includes a first channel for guiding a first one of the pluraltiy of rollers and a second channel for guiding a second one of the plurality of rollers, the second channel being generally parallel the first channel.

4. The tailgate assembly of claim 3, wherein the first and second channels each include a dog-leg portion that is configured to guide the panel structure out of the panel cavity and parallel to an inner panel of the tailgate structure.

5. The tailgate assembly of claim 4, further comprising an assist mechanism coupled to the tailgate structure and the panel structure, the assist mechanism exerting a force on the panel structure to drive the pluarlity of rollers into their respective dog-leg portions when the tailgate structure is placed in the lowered position.

6. The tailgate assembly of claim 5, wherein the assist mechanism includes a gas strut.

7. The tailgate assembly of claim 1, further comprising a hinge mechanism that is coupled to the tailgate structure and the vehicle body, the hinge mechanism having a hinge pin, a first hinge arm and a second hinge arm, a proximal end of the first hinge arm being pivotably coupled to the hinge pin, a distal end of the first hinge arm being fixedly coupled to a proximal end of the second hinge arm and a distal end of the second hinge arm being fixedly coupled to the tailgate structure.

8. The tailgate assembly of claim 7, wherein the first and second hinge arms are arranged in a generally V-shape when the tailgate structure is in the lowered position.

9. The tailgate assembly of claim 8, wherein the first and second hinge arms cooperate to space the tailgate structure apart from the vehicle body when the tailgate strucutre is placed in the lowered position.

10. The tailgate assembly of claim 1, wherein the panel structure moves vertically upward as it moves out of the panel cavity.

11. A tailgate assembly for a vehicle having a body, the tailgate assembly comprising:

a tailgate structure having an inner member and an outer member;

a hinge structure coupled to the tailgate structure and operable for rotating the tailgate structure between a generally vertical raised position and a generally horizontal lowered position;

a guide track coupled to at least one of the hinge structure and the tailgate structure;

a panel structure in sliding engagement with the guide track, the panel structure movable along the guide track between a retracted position wherein the panel structure is at least partially disposed between the inner member and the outer member and an extended position adapted to substantially close a horizontal gap between the tailgate structure and the body of the vehicle;

wherein placement of the tailgate structure in the raised position causes the panel structure to move along the guide track to the retracted position and placement of the tailgate structure in the lowered position causes the panel structure to move along the guide track to the extended position.

\* \* \* \* \*